May 29, 1973 O. L. PIRTLE, JR 3,736,101
LIQUID-LIQUID EXTRACTION APPARATUS AND METHOD
Filed June 13, 1969

INVENTOR.
BY OTHEL L. PIRTLE, JR.

ATTORNEY

United States Patent Office 3,736,101
Patented May 29, 1973

---

3,736,101
LIQUID-LIQUID EXTRACTION APPARATUS
AND METHOD
Othel L. Pirtle, Jr., 2718 Stratford,
Pearland, Tex. 77581
Filed June 13, 1969, Ser. No. 832,954
Int. Cl. B01d 11/04; G21g 1/00
U.S. Cl. 23—267
2 Claims

ABSTRACT OF THE DISCLOSURE

An apparatus and method for liquid-liquid extractor, the apparatus comprising a substantially cylindrical vertically aligned extraction chamber, a tube extending through an upper area of the wall of said chamber and extending into said chamber a distance such that its interior end which is open to said chamber terminates at a point just above the extract-raffinate interface within said chamber, the end of said tube exterior to said chamber being provided with valving means permitting alternate open communication with a solvent source and an extract receiving container, an inlet and outlet means in an upper area of the wall of said extraction chamber, said inlet and outlet means being in open communication with said chamber above the fluid fill level of said chamber, said inlet means also being in open communication with an inert gas source and said outlet means opening to a vent and said inlet and outlet means being provided with valve means for controlling flow through said inlet and outlet means, and a gas distributing means adjacent the lower end of said chamber for introducing an inert gas into the lower portion of said chamber, said gas distributing means being provided with a valve means for controlling introduction of gas into said chamber through said gas distributing means.

BACKGROUND OF THE INVENTION

The present invention relates to an apparatus and method for liquid-lijuid extraction wherein the solvent is less dense than the material to be extracted. More particularly, the present invention relates to an apparatus and method for the liquid-liquid extraction of daughter radioisotopes from solutions containing the mother radioisotope, employing solvents having a density less than that of the solution containing the mother radioisotope.

The use of technetium 99m as a diagnostic radioisotope in the diagnosis of various body malfunctions has become relatively common. In general, technetum 99m is obtained from its mother radioisotope molybdenum 99 by first, adsorbing the molybdenum 99 upon a suitable adsorbent such as alumina, and thereafter desorbing technetium 99m therefrom by means of various desorbents such as saline solutions and the like. While it has been known that technetium 99m can be solvent extracted from molybdenum 99 with various solvents such as methylethyl ketone, such recovery means has received little attention. This has been due to the fact that no acceptable method for carrying out such solvent extraction has been found. This results from the radioactive nature of the materials involved and the difficulty of handling such materials in liquid-liquid extractions. Further, it has been found most difficult to provide means for partially extracting molybdenum 99 solutions with measured quantities of solvent to obtain precise quantities of technetium 99m without the use of very cumbersome equipment and elaborate means of shielding and handling the materials to prevent exposure to radiation.

The same problems which exist in liquid-liquid extraction of molybdenum 99 to obtain technetium 99m also exist with respect to many other similar types of systems involving radioactive materials and/or which are periodically extracted with measured quantities of solvent to only partially extract a material to obtain specific quantities of extract and which involve use of solvents less dense than the material to be extracted.

It is an object of the present invention to provide a new and novel apparatus and method for liquid-liquid extraction employing solvens which are less dense than the material to be extracted.

An additional object of the present invention is to provide a new and novel apparatus and method for liquid-liquid extraction of daughter radioisotopes from solutions containing the mother radioisotope employing solvents which are less dense than the solution containing the mother radioisotopes.

Still another object of the present invention is to provide a new and novel apparatus and method which is particularly useful for the extraction of technetium 99m from solutions of molybdenum 99 in specific measured quantities with improved efficiency and simplicity of operation.

Additional objects of the present invention will become apparent from the following description of the invention hereinafter described.

SUMMARY OF THE INVENTION

The present invention, which fulfills these and other objects, is, in one of its embodiments, an apparatus for liquid-liquid extraction which comprises a substantially cylindrical vertically aligned extraction chamber, a tube extending through an upper area of the wall of said chamber and extending into said chamber a distance such that its interior end which is open to said chamber terminates at a point just above the extract-raffinate interface within said chamber, the end of said tube exterior to said chamber being provided with valving means permitting alternate open communication with a solvent source and an extract receiving container, an inlet and outlet means in an upper area of the wall of said extraction chamber, said inlet and outlet means being in open communication with said chamber above the fluid fill level of said chamber, said inlet means also being in open communication with an inert gas source and said outlet means opening to a vent and said inlet and outlet means being provided with valve means for controlling flow through said inlet and outlet means, and a gas distributing means adjacent the lower end of said chamber for introducing an inert gas into the lower portion of said chamber, said gas distributing means being provided with a valve means for controlling introduction of gas into said chamber through said gas distributing means.

In another embodiment, the present invention is a method for the liquid-liquid extraction of an extractable solution wherein said solution is to be repeatedly extracted with measured quantities of a solvent less dense than said solution to obtain specific quantities of extract, said method comprising charging an extractable solution to an extraction zone, introducing a measured predetermined quantity of solvent into said extraction zone and into contact with said extractable solution, agitating said resulting mixture by means of passage of an inert gas therethrough, ceasing such agitation and allowing extract and raffinate phases to form, forcing said extract phase to flow from said extraction zone by filling the upper portion of said extraction zone with an inert gas to thereby force said extract phase from said extraction zone through a drain opening just above the interface of said extract and raffinate phases.

By means of the apparatus and method of the present invention, a radioactive mother isotope may be repeatedly extracted with measured quantities of solvent to obtain specific quantities of the daughter radioisotope with high accuracy and efficiency. Additionally, the present invention is simple in concept and in operation and does not require cumbersome equipment and extensive shielding for liquid-liquid extraction involving radioactive materials.

DESCRIPTION OF THE PREFERRED EMBODIMENTS OF THE PRESENT INVENTION

Figure 1:
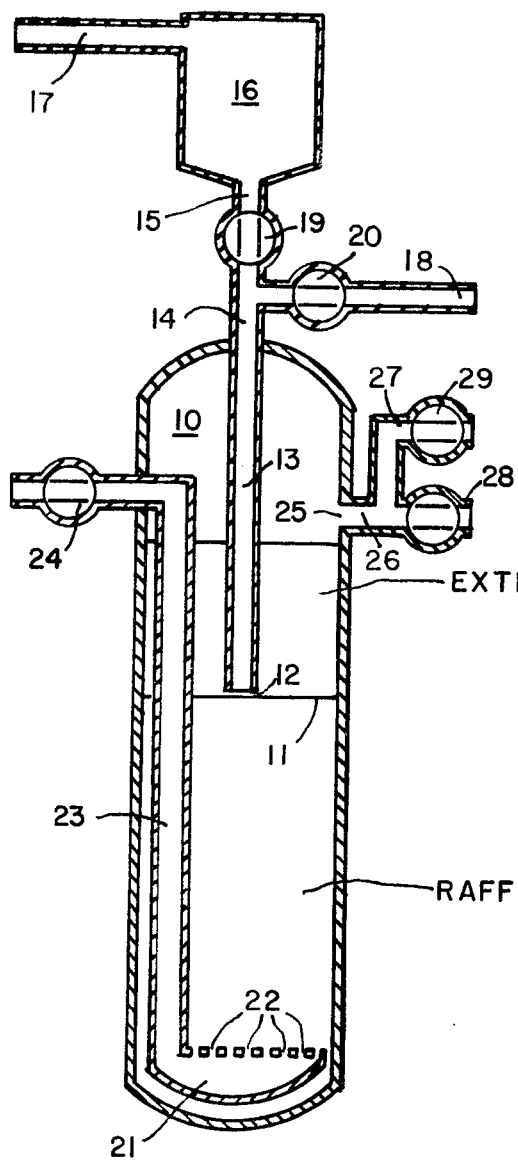
FIG. 1 of the drawings is a side cross-sectional view of an embodiment of the apparatus of the present invention.

To describe the preferred embodiments of the present invention, reference is made to the accompanying drawings. In the drawings, the same characters are used throughout to denote like features of the apparatus of the present invention.

To describe the preferred embodiments of the present invention, reference will be made to the extraction of a mother radioisotope with a solvent less dense than the solution containing the mother radioisotope, to recover the daughter radioisotope. However, the present invention has application to any solvent or liquid-liquid extraction process wherein solvents less dense than the material to be treated are employed and wherein it is desired to only partially extract the material to be extracted by repeated but separate extractions with the solvent.

To carry out the liquid-liquid extraction of a mother radioisotope in accordance with the apparatus and method of the present invention, the mother radioisotope is charged an extraction chamber 10 in quantity sufficient to bring the upper surface thereof to approximately the interface level 11 of extraction chamber 10. Interface level 11 is just below the lower open end 12 of tube 13 which extends through an upper portion of the wall of extraction chamber 10.

The upper or exterior segment 14 of tube 13 is in oven communication by means of line 15 to a solvent dispensing container 16 which is graduated or otherwise adapted for dispensing measured quantities of solvent. Solvent dispensing container 16 is in turn in communication by means of line 17 with a solvent source (not shown). Upper segment 14 also is in open communication with a product receiving container (not shown) by means of line 18. Valves 19 and 20 in lines 15 and 18, respectively, provide for alternate opening of tube segment 14 and tube 13 to flow from solvent dispensing container 15 and flow to the product receiving container. In this manner, tube 13 may answer the duel function of providing for solvent entry to extraction chamber 10 and subsequently, extract or product removal from chamber 10.

Figure 2:
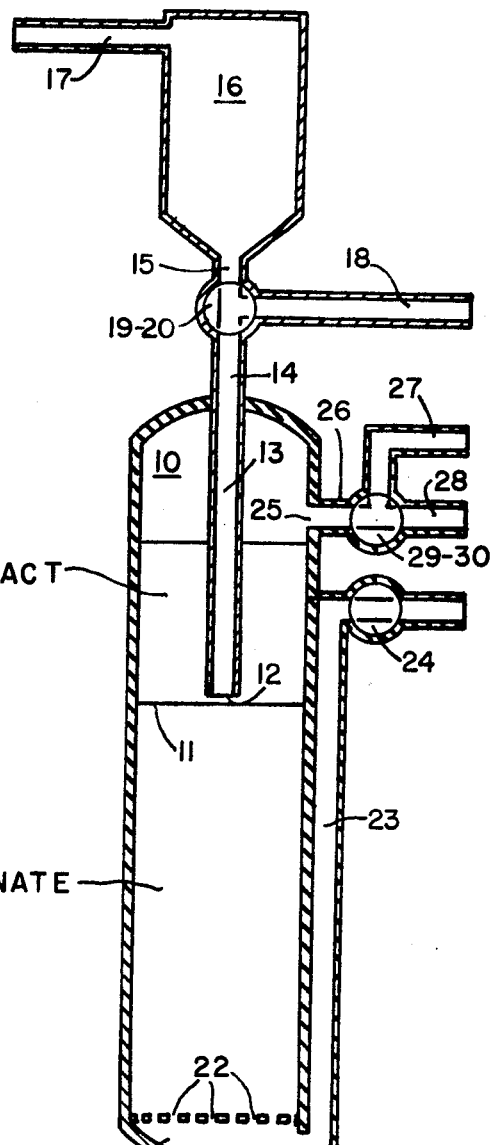
FIG. 2 of the drawings is a side cross-sectional view of another embodiment of the apparatus of the present invention.

Instead of using the two valves 19 and 20 to provide alternate communication of tube 13 with solvent dispensing container 15 and the product receiving container, a single three way valve 19–20 as shown in FIG. 2, may be employed at the confluence of lines 15 and 18. As another but less practical modification, the aforementioned functions of tube 13 may be separated by providing for two tubes such as tube 13 extending into extraction chamber 10 with one of such tubes being in open communication with a solvent dispensing container and the other in open communication with a product receiving container.

The most critical feature of tube 13, so long as it fills at least the function of product removal, is that it extend into chamber 10 to a point just above the maximum height to which chamber 10 will be filled with the mother radioisotope solution.

Figure 3:
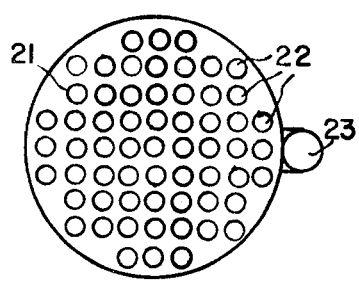
FIG. 3 of the drawings is a top view of the gas distributing sparger of the apparatus of the present invention in one of its embodiments.

Once both the solvent and the mother radioisotope have been charged to the extraction chamber 10 or concurrently with the introduction of the solvent, an inert gas is introduced into the extraction chamber 10 adjacent the bottom thereof by means of a gas distributing sparger 21 having distributing pores 22 therein. While FIG. 3 illustrates the gas distributing pores 22 in a single sparger 21, a plurality of spargers 21 having slots or orifices in symmetrical or random arrangement may be employed. Sparger 21 is in open communication with an inert gas source (not shown) by means of conduit 23. The sparger 21 may be attached to conduit 23 which extends as a dip-tube within extraction chamber 10 as shown in FIG. 1 or may be formed into the bottom of extraction chamber 10 with conduit 23 exterior to such extraction chamber 10 as shown in FIG. 2. In the extraction of radioactive materials, it generally is preferred that conduit 23 extend from sparger 21 upwardly within chamber 10 as shown in FIG. 1 or immediately adjacent chamber 10 as shown in FIG. 2, to above the fluid level of such chamber. This provides a simple but effective means of reducing the possibility of leakage or drainage of radioactive materials into conduit 23 from chamber 10 other than in the immediate area of chamber 10 which will, in such utility, be provided with shielding.

A valve 24 in conduit 23 is provided to prevent flow of liquid from extraction chamber 10 through conduit 23 during periods when a significant positive pressure is placed on the liquids within chamber 10. Also, valve 24 provides means for controlling flow of inert gas through conduit 23 into chamber 10.

An inlet and outlet means to chamber 10 above the fluid level is provided. In FIG. 1, an inlet-outlet opening 25 in the upper wall of extraction chamber 10 opens into chamber 10 above the maximum fill level of such chamber. Opening 25 also opens into a conduit 26 which communicates with vent line 27 and gas entry line 28. Vent line 27 and gas entry line 28 are provided with valves 29 and 30, respectively, to provide for alternate flow of gas through gas entry line 28, valve 30, conduit 26 and opening 25 into chamber 10 and the flow of gas from chamber 10 through opening 25, conduit 26, valve 29 and vent line 27. If desired, and as shown in FIG. 2, a three way valve 29–30 may be employed at the confluence of vent line 27 and gas entry line 28 as an alternate to the two valve arrangement above described. Additionally, though less practical, the inlet means and the outlet means for chamber 10 may be provided by separate lines such as line 27 and line 28 which open separately and directly into chamber 10.

In practicing the method of the present invention, a material to be extracted such as a solution containing a mother radioisotope, i.e., molybdenum 99, is charged to the extraction chamber 10. The amount of such material charged generally is sufficient to fill the chamber to a point just below the lower open end 12 of tube 13 which, as described above, provides for the withdrawal of the extract phase from extraction chamber 10. Of course, tube 13 may be extended through the wall of chamber 10 in slidable arrangement whereby tube 13 may be raised or lowered such as to always have open end 12 just above the upper surface of the charged material to be extracted regardless of the amount of such material charged. However, in practicing the present invention to obtain accurately measured quantities of extract having specific properties, it generally is preferred to maintain tube 13 in a fixed position and fill chamber 10 to a predetermined height just below the lower end 12 of tube 13.

After filling extraction chamber 10 with the desired quantity of the material to be extracted, a measured quantity of the solvent having a density less than such material to be extracted is introduced into chamber 10 from solvent dispensing container 16 through line 15, open valve 19 and tube 13. In the extraction of such mother radioisotopes as molybdenum 99, a preferred solvent is methyl-ethyl ketone. However, other solvents may be employed, particularly other ketones such as acetone, methyl n-propyl ketone, methyl isopropyl ketone, diethyl ketone, pentanone-2, pentanone-3, hexanone-2, hexanone-3, and the like. Valve 20 is closed during the introduction of the solvent to prevent possible loss of solvent due to passage into line 18.

Concurrently with or subsequent to the introduction of the solvent into extraction chamber 10, an inert gas is passed through valve 24, conduit 23, sparger 21, and openings 22 into the extraction chamber 10 adjacent the lower end thereof. The inert gas is one which will be inert to the components of the extraction system under the conditions employed and will vary depending upon such components and conditions. In the preferred practice of the present invention to extract daughter radioisotopes from mother radioisotopes with ketones as solvents, helium and argon are inert gases of choice. However, such gases as nitrogen, methane, ethane, propane, and the like may be employed as the inert gas if desired. The rate of introduction of inert gas is such as to bring about a desired amount of agitation of the liquids within extraction chamber 10. The degree of agitation desired will vary with the quantities of solvent and material to be extracted, dimensions of the extraction chamber, materials being extracted, distribution and number of openings 22 and like considerations and may be readily determined by those skilled in the art. By the agitation provided by the inert gas introduced through openings 22 and sparger 21, the desired mixing of solvent and material to be extracted is achieved.

During the course of introducing inert gas through sparger 21 into extraction chamber 10, valve 29 is open and valve 30 closed thereby permitting the inert gas to pass from extraction chamber 10 through opening 25 and vent line 27. While line 27 is referred to as a vent line, it may be used to transport the inert gas to a storage area or convey the gas to a compression area for compression for reuse as the purge gas or the like.

If the inert gas is introduced subsequent to introduction of solvent through tube 13, it usually is desirable to maintain valve 19 closed along with valve 20 to prevent any possibility of solvent phase being forced into dispensing container 16 or being prematurely forced into the product receiving line 18 or of inert gas passing upward through tube 13.

After the desired period of agitation, valve 24 is closed thereby preventing further passage of inert gas into chamber 10 through sparger 21. Distinct extract and raffinate phases are allowed to form. Valve 29 is then closed and valves 30 and 20 opened. If not already closed, valve 19 also is closed. An inert purge gas which may be the same or different to that used for agitation as described above, is then passed into the upper void portion of extraction chamber 10 through line 28, valve 30, line 26 and opening 25. The inert gas in the upper void of the chamber 10 exerts pressure upon the liquids within the chamber and thereby forces the upper or extract phase through the open lower end 12 of tube 13 and then upward through tube 13 and segment 14, through valve 20 and line 18 to the product receiving area.

After the extract phase has been removed from chamber 10, valve 30 is closed and valve 29 opened to vent the inert gases, if any, remaining in chamber 10. An additional quantity of solvent is then introduced into chamber 10 as described above and the remaining steps discussed above repeated.

While the apparatus and method of the present invention find utility in the liquid-liquid extraction of virtually any material employing solvents less dense than the material to be extracted, they are particularly useful in the extraction of daughter radioisotopes such as technetium 99m from the mother radioisotopes such as molybdenum 99 with such solvents as the ketones, particularly methylethyl ketone.

I claim:

1. An apparatus for liquid-liquid extraction which comprises a substantially cylindrical vertically aligned extraction chamber, a tube extending through an upper area of the wall of said chamber and extending into said chamber a distance such that its interior end which is open to said chamber terminates at a point just above the extract-raffinate interface within said chamber, the end of said tube exterior to said chamber being provided with valving means permitting alternate open communication with a solvent source and an extract receiving container, an inlet and outlet means in an upper area of the wall of said extraction chamber, said inlet and outlet means being in open communication with said chamber above the liquid fill level of said chamber, said inlet means also being in open communication with an inert gas source and said outlet means opening to a vent and said inlet and outlet means being provided with valve means for controlling flow through said inlet and outlet means, and a gas distributing means for introducing an inert gas into the lower portion of said chamber, said gas distributing means comprising a sparger having a plurality of openings therein, said sparger lying adjacent the bottom of said chamber and being in open communicaiton with a conduit extending from said sparger upward to a point approximately above the fill level of said chamber, said gas distributing means being provided with a valve means for controlling flow through said gas distributing means.

2. The apparatus of claim 1 wherein said solvent source comprises a graduated container for dispensing measured quantities of solvent into said chamber.

References Cited

UNITED STATES PATENTS

| | | | |
|---|---|---|---|
| 2,570,408 | 10/1951 | Gorder | 23—87 R |
| 985,598 | 2/1911 | Jeanson | 137—172 |
| 3,181,700 | 5/1965 | Hesson | 137—172 |
| 3,382,152 | 5/1968 | Leeberman | 176—16 |
| 2,771,346 | 11/1956 | Lambers | 23—270.5 |
| 2,851,396 | 9/1958 | Myers | 23—270.5 |

FOREIGN PATENTS

| | | | |
|---|---|---|---|
| 816,620 | 9/1956 | Great Britain | 23—294 |
| 1,121,845 | 7/1968 | Great Britain | 23—87 |

OTHER REFERENCES

Mellor—Comp. Treatise on Inorganic and Theoretical Chem. vol. 4, pp. 797–805.

Richards, Technetium 99m, May 1969 Microfilm No. BNL 13564 pp. 7 and 8.

Perrys Chem. Eng. Handbook pp. 21–17, fourth edition 1963.

NORMAN YUDKOFF, Primary Examiner

S. SILVERBERG, Assistant Examiner

U.S. Cl. X.R.

23—312 ME; 176—16; 252—301.1 WD